(12) United States Patent
Nishimura (10) Patent No.: US 10,451,822 B2
(45) Date of Patent: Oct. 22, 2019

(54) OPTICAL MODULE MANUFACTURING METHOD, OPTICAL MODULE RECEPTACLE AND OPTICAL MODULE

(71) Applicant: FUJIKURA LTD., Tokyo (JP)

(72) Inventor: Akito Nishimura, Chiba (JP)

(73) Assignee: Fujikura Ltd., Tokyo (JP)

(*) Notice: Subject to any disclaimer, the term of this patent is extended or adjusted under 35 U.S.C. 154(b) by 0 days.

(21) Appl. No.: 15/077,335

(22) Filed: Mar. 22, 2016

(65) Prior Publication Data
US 2016/0282570 A1 Sep. 29, 2016

(30) Foreign Application Priority Data
Mar. 25, 2015 (JP) .................. 2015-061933

(51) Int. Cl.
*G02B 6/42* (2006.01)
*G02B 6/00* (2006.01)

(52) U.S. Cl.
CPC .......... *G02B 6/423* (2013.01); *G02B 6/4227* (2013.01); *G02B 6/4249* (2013.01); *G02B 6/4274* (2013.01)

(58) Field of Classification Search
CPC .................................. G02B 6/42; G02B 6/423
USPC ........................................................ 385/92
See application file for complete search history.

(56) References Cited

U.S. PATENT DOCUMENTS

| | | | | |
|---|---|---|---|---|
| 6,599,032 B1 * | 7/2003 | Kurashima | .......... | G02B 6/3885 385/24 |
| 7,616,845 B2 * | 11/2009 | Matsuoka | .......... | G02B 6/12007 385/14 |
| 8,532,449 B2 * | 9/2013 | Mohammed | .......... | G02B 6/322 385/14 |
| 8,777,497 B2 * | 7/2014 | Kim | .......... | G02B 6/4246 385/14 |
| 8,979,392 B2 * | 3/2015 | Lin | .......... | G02B 6/4201 385/33 |
| 9,151,916 B2 * | 10/2015 | Pommer | .......... | G02B 6/4201 |

(Continued)

FOREIGN PATENT DOCUMENTS

JP   2000-082830 A   3/2000
JP   2001-324631 A   11/2001

(Continued)

OTHER PUBLICATIONS

Office Action issued in corresponding Japanese Application No. 2015-061933 dated Aug. 28, 2018 (13 pages).

(Continued)

*Primary Examiner* — Kaveh C Kianni
(74) *Attorney, Agent, or Firm* — Osha Liang LLP (57) ABSTRACT

Disclosed is manufacturing method of an optical module including an optical/electrical converter, a receptacle, and a substrate, the method including: the receptacle that has a guide portion that aligns an optical connector ferrule that holds an end portion of an optical fiber and that has a device accommodating portion that matches with a profile of the optical/electrical converter; a process of accommodating the optical/electrical converter in the device accommodating portion; a process of securing the optical/electrical converter to the receptacle; and a process of electrically connecting to the substrate that electrically connects to the optical/electrical converter the optical/electrical converter secured to the receptacle.

12 Claims, 5 Drawing Sheets

(56) References Cited

U.S. PATENT DOCUMENTS

| | | | |
|---|---|---|---|
| 9,519,116 B2* | 12/2016 | Hung | H04B 10/40 |
| 2001/0041034 A1 | 11/2001 | Sasaki et al. | |
| 2003/0123819 A1* | 7/2003 | Nakanishi | G02B 6/4214 |
| | | | 385/92 |
| 2006/0098923 A1* | 5/2006 | Fujiwara | G02B 6/4214 |
| | | | 385/88 |
| 2006/0188211 A1* | 8/2006 | Iwase | G02B 6/1228 |
| | | | 385/137 |
| 2009/0032984 A1* | 2/2009 | Iwase | G02B 6/1228 |
| | | | 264/1.28 |
| 2010/0135618 A1* | 6/2010 | Howard | G02B 6/3829 |
| | | | 385/79 |
| 2013/0108224 A1* | 5/2013 | Ishigami | G02B 6/4284 |
| | | | 385/89 |
| 2013/0259423 A1* | 10/2013 | Charbonneau-Lefort | |
| | | | G02B 6/4206 |
| | | | 385/33 |
| 2015/0010273 A1* | 1/2015 | Oyagi | G02B 6/428 |
| | | | 385/33 |
| 2015/0323420 A1* | 11/2015 | Kuznia | G01M 11/3145 |
| | | | 356/73.1 |
| 2016/0041350 A1* | 2/2016 | Hung | G02B 6/4214 |
| | | | 385/33 |

FOREIGN PATENT DOCUMENTS

| | | |
|---|---|---|
| JP | 2006-065358 A | 3/2006 |
| JP | 2006-184757 A | 7/2006 |
| JP | 2012-083488 A | 4/2012 |
| JP | 2013-235243 A | 11/2013 |
| JP | 2014-102395 A | 6/2014 |

OTHER PUBLICATIONS

Office Action issued in corresponding Japanese Application No. 2015-061933 dated Mar. 19, 2019 (8 pages).

* cited by examiner

//‎ # OPTICAL MODULE MANUFACTURING METHOD, OPTICAL MODULE RECEPTACLE AND OPTICAL MODULE

CROSS-REFERENCE TO RELATED APPLICATION

The present application claims the benefit of priority pursuant to 35 U.S.C. § 119(a) to Japanese Patent Application No. 2015-061933, filed on Mar. 25, 2015, the entire disclosure of which is hereby incorporated herein by reference.

BACKGROUND

Technical Field

Embodiments of this disclosure generally relate to an optical module manufacturing method, an optical module receptacle and an optical module.

Related Art

Alignment by active alignment may be performed when optically coupling an optical fiber to an optical/electrical converter mounted on a substrate. During active alignment, the optical fiber and the optical/electrical converter are relatively moved to have the two aligned such that, for example, the light coming into the optical fiber becomes most intense when the optical/electrical converter is in a light-emitting state. Such an active alignment process is time consuming resulting to have low productivity and be a costly method.

In contrast to active alignment, there is a method of performing passive alignment. For example, U.S. Patent Application No. 20100135618 (hereinafter, USPA-20100135618) discloses inserting the guide pins, of the optical connector ferrule (reference numeral 20 in USPA-20100135618) holding an end portion of an optical fiber, into the guide pin holes of the receptacle (reference numeral 80 in USPA-20100135618) on the substrate having mounted an optical/electrical converter allows for passive alignment between the optical connector ferrule and the receptacle which in turn allows for passive optical connection between the optical/electrical converter and the optical fiber.

Further, Japanese Patent Application Laid-open Publication No. 2001-324631 (hereinafter, JP-A-2001-324631) discloses passive alignment with a configuration different from that in USPA-20100135618. JP-A-2001-324631 discloses forming a level difference for alignment to a substrate (reference number 1 in JP-A-2001-324631) equipped with an optical waveguide or an optical device and also forming a complementary level difference to an optical fiber connecting end component (reference number 2 in JP-A-2001-324631) used to match the two level differences to passively perform the alignment between the two.

In the structure disclosed in USPA-20100135618, the receptacle which aligns the optical connector ferrule needs to be mounted to the substrate, with a high degree of accuracy with respect to the optical/electrical converter mounted on the substrate. However, if an active alignment was to be performed when aligning the optical/electrical converter to the receptacle the process would be time consuming resulting to have low productivity and be expensive.

It is therefore an objective of the present invention to perform simple alignment of the receptacle and the optical/electrical converter on the substrate.

SUMMARY

The present invention is directed to a manufacturing method of an optical module including an optical/electrical converter, a receptacle, and a substrate, the method including: the receptacle that has a guide portion that aligns an optical connector ferrule that holds an end portion of an optical fiber and that has a device accommodating portion that matches with a profile of the optical/electrical converter; a process of accommodating the optical/electrical converter in the device accommodating portion; a process of securing the optical/electrical converter to the receptacle; and a process of electrically connecting to the substrate that electrically connects to the optical/electrical converter the optical/electrical converter secured to the receptacle.

Other features of the present invention will become apparent from the following descriptions of the present specification and of the accompanying drawings.

According to the present invention, alignment of the receptacle and the optical/electrical converter on the substrate can be performed simply.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION

At least the following details will become apparent from the description of this specification and of the accompanying drawings.

An optical module manufacturing method including an optical/electrical converter, a receptacle, and a substrate, the method including: the receptacle that has a guide portion that aligns an optical connector ferrule that holds an end portion of an optical fiber and that has a device accommodating portion that matches with a profile of the optical/electrical converter; a process of accommodating the optical/electrical converter in the device accommodating portion; a process of securing the optical/electrical converter to the receptacle; and a process of electrically connecting to the substrate that electrically connects to the optical/electrical converter the optical/electrical converter secured to the receptacle will be made apparent.

According to such an optical module manufacturing method, alignment of the optical/electrical converter with the receptacle on the substrate can be performed simply.

It is preferable to include a process of securing the receptacle to the substrate after the process of electrically connecting the optical/electrical converter to the substrate. Hereby, damages to the connection between the optical/electrical converter and the substrate can be suppressed.

It is preferable that the receptacle has an optical component accommodating portion that accommodates an optical component deposited between the optical/electrical converter and the optical connector ferrule, and there is included a process of accommodating the optical component in the optical component accommodating portion and securing the optical component to the receptacle. Hereby, the optical component and the receptacle can be passively aligned.

It is preferable that the receptacle has the device accommodating portion formed in a depressed shape and a light transmission portion positioned between the optical/electrical converter and the optical connector ferrule. Hereby, the optical/electrical converter and the light transmission portion of the receptacle can be passively aligned.

It is preferable that the receptacle has a wiring including a device side terminal deposited to the device accommodating portion and a substrate side terminal deposited on a face on a side of the substrate, and the optical/electrical converter secured to the receptacle is electrically connected to the substrate by electrically connecting the optical/electrical converter to the device side terminal and electrically connecting the substrate to the substrate side terminal. Hereby, the optical/electrical converter can be electrically connected to the substrate even when the electrode terminal of the optical/electrical converter is not disposed on the substrate side.

It is preferable that the receptacle has a wire accommodating portion formed in a manner connected to the device accommodating portion and a bonding wire formed to the wire accommodating portion electrically connects a terminal of the optical/electrical converter and a terminal of the substrate arranged inside the wire accommodating portion. Hereby, the optical/electrical converter can be electrically connected to the substrate even when the electrode terminal of the optical/electrical converter is not disposed on the substrate side.

A manufacturing method of an optical module including an optical/electrical converter, a receptacle, a substrate and an optical connector ferrule, the method including: the receptacle that has a guide portion that positions an optical connector ferrule that holds an end portion of an optical fiber having a device accommodating portion that matches with a profile of the optical/electrical converter; a process of accommodating the optical/electrical converter in the device accommodating portion; a process of securing the optical/electrical converter to the receptacle; a process of electrically connecting to the substrate that electrically connects to the optical/electrical converter the optical/electrical converter secured to the receptacle; and a process of aligning the receptacle with the optical connector ferrule including a guide portion and holds an end portion of an optical fiber, using the guide portion of the receptacle and the guide portion of the optical connector ferrule, and optically connecting the optical/electrical converter and the optical fiber will be made apparent.

According to such an optical module manufacturing method, alignment of the optical/electrical converter with the receptacle on the substrate can be performed simply.

An optical module including: an optical/electrical converter; a receptacle that has a guide portion that aligns an optical connector ferrule that holds an end portion of an optical fiber; and a substrate that electrically connects to the optical/electrical converter, wherein the receptacle has a device accommodating portion that matches with a profile of the optical/electrical converter, the optical/electrical converter is accommodated in the device accommodating portion, the optical/electrical converter is secured to the receptacle, and the optical/electrical converter secured to the receptacle is electrically connected to the substrate will be made apparent.

According to such an optical module, alignment of the optical/electrical converter with the receptacle on the substrate can be performed simply.

An optical module receptacle that aligns an optical connector ferrule to an optical/electrical converter mounted on a substrate, including: a guide portion that aligns the optical connector ferrule; and a device accommodating portion that accommodates the optical/electrical converter and matches with a profile of the optical/electrical converter, will be made apparent.

According to such an optical module receptacle, alignment of the optical/electrical converter with the receptacle on the substrate can be performed simply.

PRESENT EMBODIMENT

<Basic Configuration>

Figure 1A:
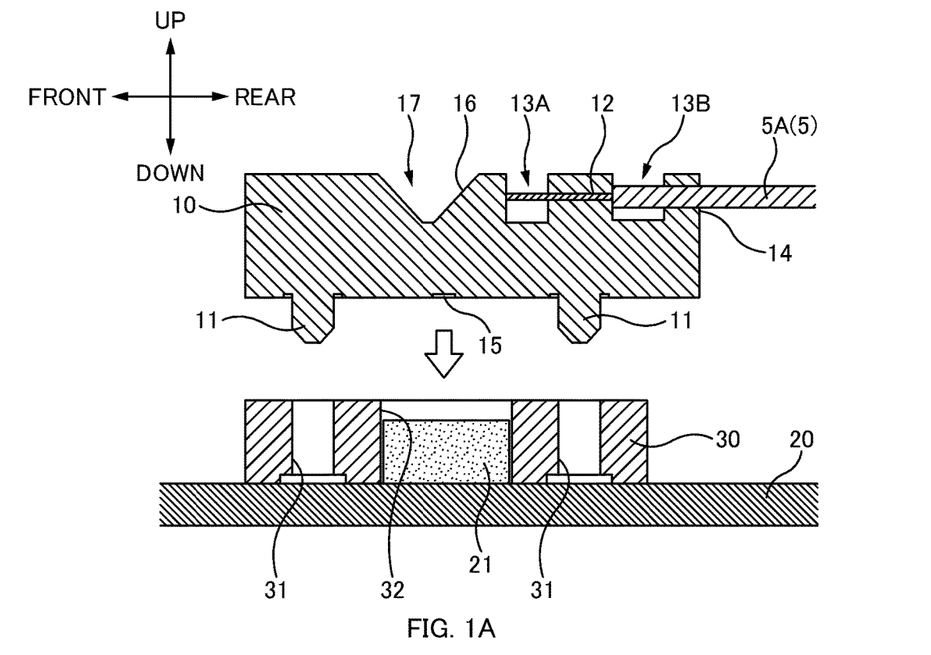
FIG. 1A and FIG. 1B are sectional views describing an optical module 1 according to the present embodiment of the present invention.
Figure 1B:
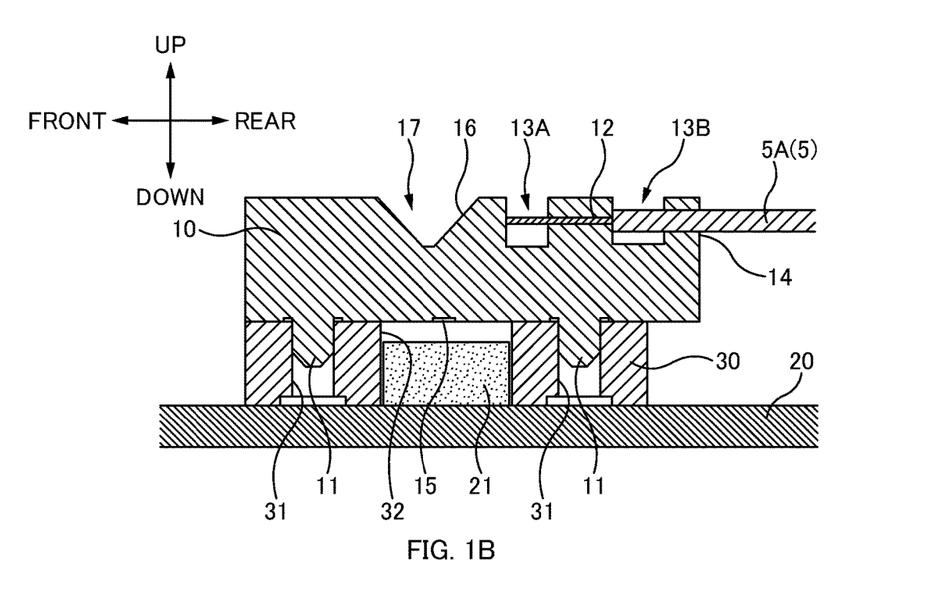
Figure 2:
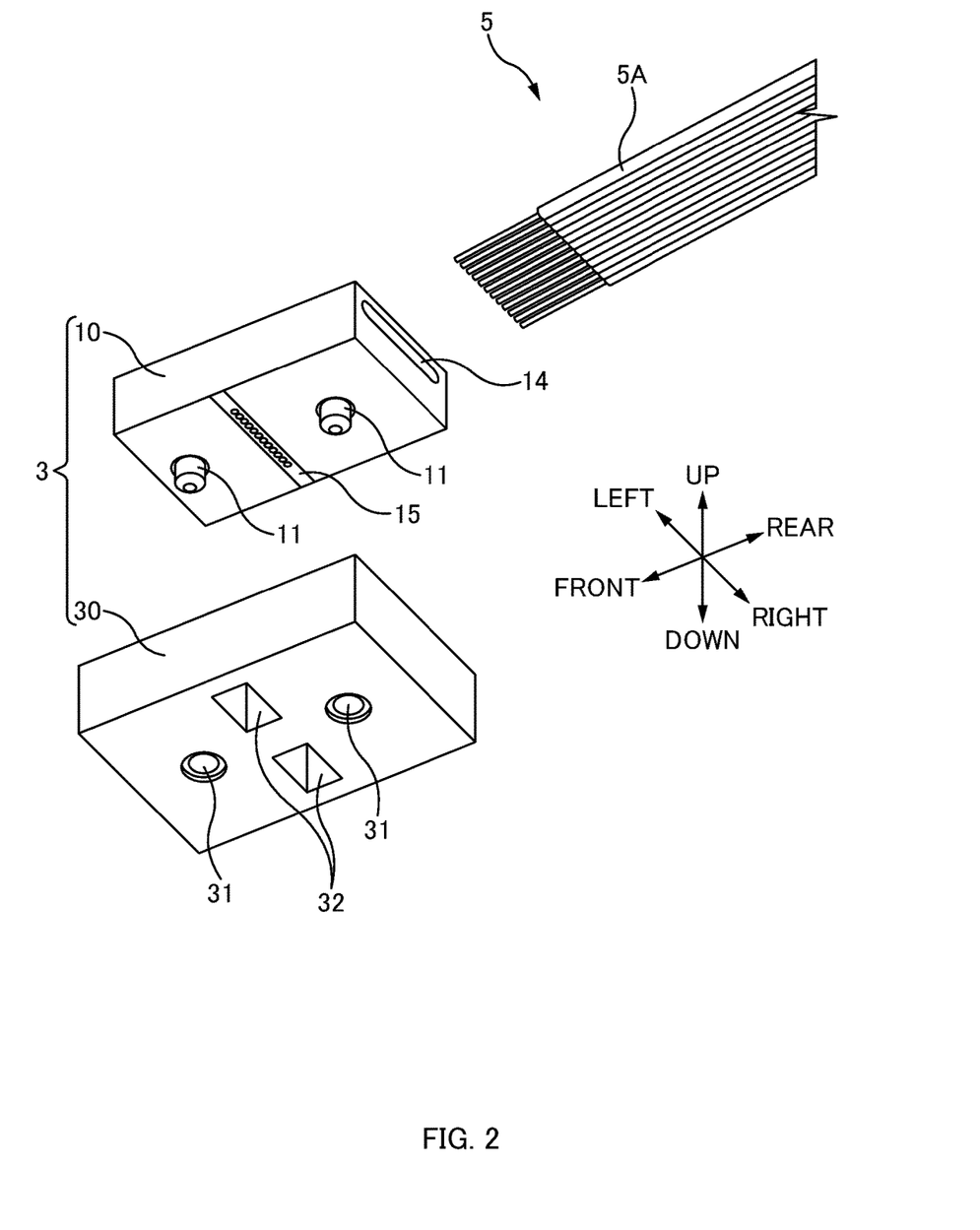
FIG. 2 is an exploded perspective view of the optical module 1 according to the present embodiment.

FIG. 1A and FIG. 1B are sectional views describing an optical module 1 according to the present embodiment of the present invention. FIG. 1A is an explanatory view of an optical coupling and FIG. 1B is an explanatory view showing an optically coupled state. FIG. 2 is an exploded perspective view of the optical module 1 according to the present embodiment.

The directions will be defined in the following description. To be specific, the light entry/exit directions into/out from the optical/electrical converter 21 (see FIG. 1A and FIG. 1B) mounted on the substrate 20 are defined as the "up-down direction" and the side of the optical/electrical converter 21 seen from the substrate 20 is defined as "up" and the opposite side thereof as "down". Further, the direction in which the plurality of optical fibers 5A (see FIG. 2) of the optical ribbon fiber 5 are aligned is defined as the "right-left direction". Furthermore, the direction which is perpendicular to the right-left direction as well as the up-down direction is defined as the "front-rear direction" and the side in which the optical fibers 5A extend from the optical connector ferrule 10 is defined as the "rear" and the opposite side thereof the "front".

The optical module 1 is a device which performs at least one of transmitting and receiving optical signals. For example, the optical module 1 is an optical transceiver module (transmitting and receiving device) which performs transmission and reception of optical signals. Here, the optical module 1 may be an optical transmitter module (transmitting device) which transmits optical signals or an optical receiver module (receiving device) which receives optical signals.

As illustrated in FIG. 1A, the optical module 1 includes an optical/electrical converter 21, a receptacle 30 and a substrate 20. The optical/electrical converter 21 is directly mounted (electrically connected) on the substrate 20. The optical/electrical converter 21 is secured to the receptacle 30 using a non-illustrated adhesive (e.g. ultraviolet cured resin and thermoset resin) in a state accommodated in the device accommodating portion 32 of the receptacle 30. The receptacle 30 is secured to the substrate 20. And the receptacle 30 has formed guide pin holes 31.

As illustrated in FIG. 1B, passive alignment of the optical connector ferrule 10 to the receptacle 30 is performed with the guide pins 11 of the optical connector ferrule 10 being inserted into the guide pin holes 31 of the receptacle 30 and hereby, the optical/electrical converter 21 and the optical fibers 5A of the optical connector ferrule 10 are optically coupled. In other words, the receptacle 30 aligns the optical connector ferrule 10 with respect to the optical/electrical converter 21 mounted on the substrate 20. An optical connector 3 which optically couples the optical fibers 5A to the optical/electrical converter 21 is configured with the optical connector ferrule 10 and the receptacle 30. The optical module 1 may mean a configuration also including the optical connector ferrule 10.

Optical Connector Ferrule 10

The optical connector ferrule 10 is a member which holds the end portions of the optical fibers 5A which transmit optical signals. The optical connector ferrule 10 includes two guide pins 11, a plurality of optical fiber holes 12, an optical fiber insert hole 14, an optical signal face 15 and a reflecting face 16. The optical connector ferrule 10 is integrally formed with transparent resin which allows optical signals to pass therethrough. The optical signals entering into and exiting out from the endfaces of the optical fibers 5A are refracted at the reflecting face 16 to enter into and exit from the optical signal face 15.

The guide pins 11 are pins (guide portions) to be inserted into the guide pin holes 31 of the receptacle 30. The optical connector ferrule 10 and the receptacle 30 are aligned by inserting the guide pins 11 of the optical connector ferrule 10 into the guide pin holes 31 of the receptacle 30. When the optical connector ferrule 10 is aligned with the receptacle 30, the optical/electrical converter 21 and the optical fibers 5A of the optical connector ferrule 10 would be aligned since the receptacle 30 and the optical/electrical converter 21 are secured on the substrate 20 to have a predetermined positional relationship, as to be described later. The guide pins 11 project out from the bottom face of the optical connector ferrule 10. The two guide pins 11 are parallel to the up-down direction (direction perpendicular to the optical signal face 15.)

The optical fiber holes 12 are holes for having the end portions of the optical fibers 5A inserted. The optical fiber holes 12 would have inserted bare fiber having the coatings stripped off from the optical fiber. The optical fiber holes 12 penetrate to extend between the first adhesive filling portion 13A and the second adhesive filling portion 13B. The optical fibers 5A are aligned to the optical connector ferrule 10 by the optical fibers 5A being inserted into the optical fiber holes 12 until the endfaces of the optical fibers 5A abut against the front wall on the front side of the first adhesive filling portion 13A. The plurality of the optical fiber holes 12 are formed to be arranged along the right-left direction.

Here, the first adhesive filling portion 13A and the second adhesive filling portion 13B are cavities for having adhesives filled therein. The first adhesive filling portion 13A is a cavity for applying adhesive to the end portions of the optical fibers 5A projecting out from the optical fiber holes 12. The second adhesive filling portion 13B is a cavity for applying adhesive to the optical ribbon fiber 5 at the rear side with respect to the optical fiber holes 12.

The optical fiber insert hole 14 is an insert hole for inserting the optical fibers 5A (optical ribbon fiber 5) through the optical connector ferrule 10. The optical fiber insert hole 14 penetrates to extend between the rear side endface of the optical connector ferrule 10 and the second adhesive filling portion 13B and the optical fiber insert hole 14 is opened at the rear side endface of the optical connector ferrule 10.

The optical signal face 15 is a face which has optical signals enter therein or exit out therefrom and is formed on the under face of the optical connector ferrule 10. The optical signal face 15 would have a plurality of optical signals entering therein or exiting therefrom. The optical signal face 15 of the optical connector ferrule 10 opposes the opening of the device accommodating portion 32 of the receptacle 30 and the top face (face where optical signals enter therein or exit therefrom) of the optical/electrical converter 21 when the optical connector ferrule 10 is aligned with the receptacle 30. The optical signal face 15 is formed parallel to the right-left direction. Further, the optical signal face 15 is arranged between the two guide pins 11. Furthermore, the lenses are formed to the optical signal face 15 along the right-left direction. The lenses of the optical signal face 15 are arranged on the optical paths of the optical signals. Here, the optical signal face 15 may be planar without having the lenses disposed to the optical signal face 15.

The reflecting face 16 is a face which reflects optical signals. The inclined endface on the front side of the front wall which positions the endfaces of the optical fibers 5A acts as the reflecting face 16. A depressed portion 17 is formed on the top face of the optical connector ferrule 10 and the inclined endface on the rear side of the depressed portion 17 acts as the reflecting face 16. The reflecting face 16 is a boundary face between the atmosphere and the resin which configures the optical connector ferrule 10 and light is reflected on the boundary face between the two with a refractive index difference between the two. The reflecting face 16 is formed parallel along the right-left direction. The reflecting face 16 may be a flat face or a lens face (curved face.)

The optical signals which pass through the optical connector ferrule 10 would be reflected by the reflecting face 16. The optical signals would be reflected by the reflecting face 16 to exit from the optical signal face 15 toward the optical/electrical converter 21 when the optical signals exit from the endfaces of the optical fibers 5A. Further, the optical signals would be reflected by the reflecting face 16 to enter into the endfaces of the optical fibers 5A when the optical signals enter from the optical/electrical converter 21 into the optical signal face 15.

Here, the optical paths between the optical signal face 15 and the reflecting face 16 are parallel to the optical axis of the optical/electrical converter 21 accommodated in the device accommodating portion 32 of the receptacle 30, and the optical paths between the reflecting face 16 and the endfaces of the optical fibers 5A are parallel to the optical paths of the optical fibers 5A and are in a direction intersecting the optical axis of the optical/electrical converter 21. Here the optical axes of the optical fibers 5A are assumed to be orthogonal to the optical axis of the optical/electrical converter 21 but may be arranged inclined and not orthogonal thereto. The optical connector ferrule 10 functions as an optical path converter by including the reflecting face 16.

Optical/Electrical Converter 21

The optical/electrical converter 21 is an optical device which mutually converts the electrical signals processed at the substrate 20 with the optical signals transmitted to the optical fibers 5A. A light-emitting device (e.g., vertical cavity surface emitting laser which emits vertical light to the substrate 20) which converts electrical signals into optical signals, a light-receiving device (e.g., photodiode) which converts optical signals into electrical signals, and the like can be given as examples of the optical/electrical converter 21. The top face of the optical/electrical converter 21 has disposed points (light emitting points or light receiving points) for the light signals to enter and exit therefrom.

The profile of the optical/electrical converter 21 is formed by cutting with a high degree of accuracy to have a predetermined positional relationship with respect to the entrance and exit points of the optical signals. Hereby, the outer face of the optical/electrical converter 21 functions as a guiding face for positioning the entrance and exit points of the optical/electrical converter 21 with respect to the receptacle 30.

The optical/electrical converter 21 is electrically connected to the substrate 20 by such as flip-chip mounting and the like. Further, the optical/electrical converter 21 is secured, to the receptacle 30, inside the device accommodating portion 32 using adhesives. The method of connecting the optical/electrical converter 21 to the substrate 20 is to be described later.

Receptacle 30

The receptacle 30 is a member used for aligning the optical connector ferrule 10 to the optical/electrical converter 21 mounted on the substrate 20. The receptacle 30 includes two guide pin holes 31 and a device accommodating portion 32.

The guide pin holes 31 are holes (guide portions) for having inserted therein the guide pins 11 of the optical connector ferrule 10. The guide pin holes 31 penetrate through the receptacle 30 in the up-down direction and two guide pin holes 31 are opened to the top face of the receptacle 30. The two guide pin holes 31 are disposed to be arranged in the front-rear direction and are formed arranged in the front-rear direction in a manner sandwiching the device accommodating portion 32 when seen from the right-left direction. Here, the guide portions of the optical connector ferrule 10 may be the guide pin holes and the guide portions of the receptacle 30 may be the guide pins. Further, the guide portions which align the optical connector ferrule 10 to the receptacle 30 need not be guide pins and guide pin holes and other forms and structures may do.

The device accommodating portion 32 is a section which accommodates the optical/electrical converter 21 mounted on the substrate 20 and is formed to match the profile of the optical/electrical converter 21 (so that the optical/electrical converter 21 fits therein.) The inner wall faces of the device accommodating portion 32 functions as the guide faces for aligning the optical/electrical converter 21 (specifically, the entrance and exit points of the optical signals of the optical/electrical converter 21.) The inner wall faces of the device accommodating portion 32 are formed with a high degree of accuracy to have a predetermined positional relationship with respect to the guide pin holes 31.

The top face and the bottom face of the receptacle 30 have opened the device accommodating portion 32. Optical signals would enter and exit, through the openings on the upper side of the device accommodating portion 32, between the optical/electrical converter 21 and the optical signal face 15 of the optical connector ferrule 10. Further, the optical/electrical converter 21 would be inserted through the opening of the device accommodating portion 32 and accommodated into the device accommodating portion 32.

The receptacle 30 according to the present embodiment includes two device accommodating portions 32. One device accommodating portion 32 would have accommodated therein a light-emitting device and the other device accommodating portion 32 would have accommodated therein a light-receiving device. Here, the number of the device accommodating portion 32 may be one or more.

The receptacle 30 is secured to the substrate 20 using non-illustrated adhesive (e.g. ultraviolet cured resin and thermoset resin.) The procedures in which the receptacle 30 and the substrate 20 are secured will be described later.

<Manufacturing Method of Optical Module 1>

Figure 3A:
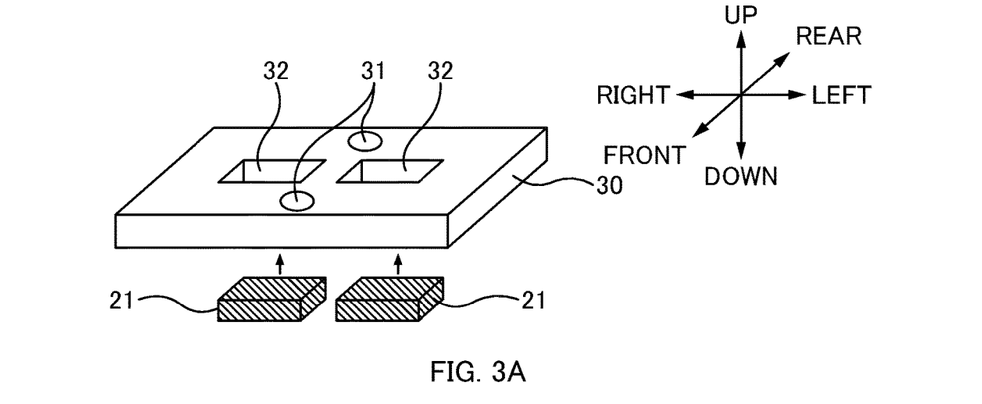
FIG. 3A, FIG. 3B and FIG. 3C are explanatory diagrams of a manufacturing method of the optical module 1.
Figure 3B:
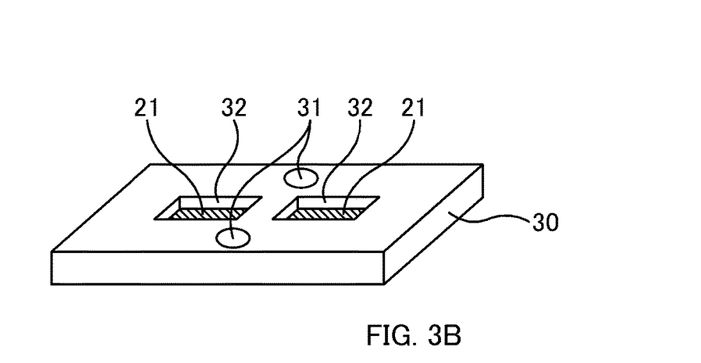
Figure 3C:
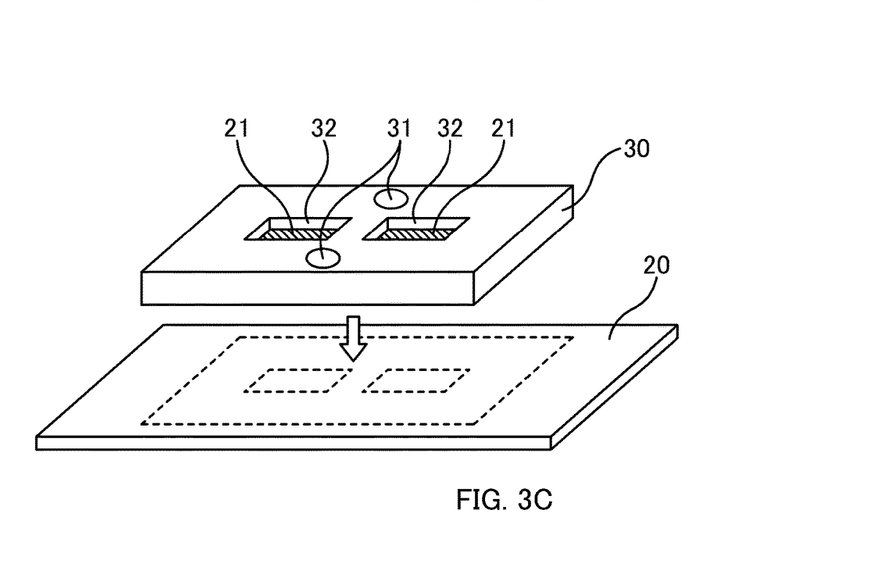

FIGS. 3A to 3C illustrate the manufacturing method of the optical module 1. The procedures described in the following may be performed by a worker or by an assembling device in a manufacturing facility.

Firstly, optical/electrical converters 21 and a receptacle 30 are prepared and the optical/electrical converters 21 are accommodated in the device accommodating portions 32 of the receptacle 30 (see FIG. 3A and FIG. 3B.) The device accommodating portions 32 are formed to match with the profile of the optical/electrical converters 21 so that the outer faces of the optical/electrical converters 21 would come into contact with the inner wall faces of the device accommodating portions 32 of the receptacle 30 for the optical/electrical converters 21 to be aligned with respect to the receptacle 30. For example, the side faces of the optical/electrical converters 21 coming into contact with the inner wall faces of the device accommodating portions 32 of the receptacle 30 allows the entrance and exit points of the optical/electrical converter 21 to be aligned in the front-rear direction and the right-left direction with respect to the receptacle 30. Hereby, the optical/electrical converters 21 are passively aligned with respect to the receptacle 30.

As described above, the profile of the optical/electrical converters 21 are formed with a high degree of accuracy to have predetermined positional relationships with respect to the entrance and exit points of the optical signals, and the inner wall faces of the device accommodating portions 32 are formed with a high degree of accuracy to have predetermined positional relationships with respect to the guide pin holes 31. For such reason, the entrance and exit points of the optical/electrical converter are aligned with a high degree of accuracy to have predetermined positional relationships with respect to the guide pin holes 31 of the receptacle 30 when the optical/electrical converters 21 are accommodated in the device accommodating portions 32 of the receptacle 30.

Then the optical/electrical converter 21 is secured to the receptacle 30 (see FIG. 3B.) At this time, adhesive (ultraviolet cured resin, thermoset resin etc.) is applied between the outer faces of the optical/electrical converter 21 and the inner wall faces of the receptacle 30 and then the adhesive is cured to secure the optical/electrical converters 21 to the receptacle 30.

Thereafter, the substrate 20 is prepared and the optical/electrical converters 21 secured to the receptacle 30 are electrically connected to the substrate 20 (see FIG. 3C.) Electrical connection between the optical/electrical converters 21 and the substrate 20 is performed by, for example, flip-chip connection. And hereby, the optical/electrical converters 21 are mounted on the substrate 20.

By the way, there is a case where the optical/electrical converters 21 are misaligned from a desired position on the substrate 20 when connecting (mounting) the optical/electrical converters 21. In other words, there is a case where the mounting of the optical/electrical converters 21 is performed with low accuracy. But, the entrance and exit points of the optical/electrical converters 21 being aligned with a high degree of accuracy to the guide pin holes of the receptacle 30 permits the optical/electrical converters 21 positioned on the substrate 20 with low accuracy. Therefore, in the present embodiment, active alignment is not required during mounting of the optical/electrical converters 21. Further, since the position of the receptacle 30 with respect to the substrate is also determined when securing the optical/electrical converters 21 on the substrate 20, active alignment is also not required when securing the receptacle 30 to the substrate 20.

In this way, since the active alignment procedure can be omitted, the manufacturing procedure is made simple and the process time shortened to improve the productivity according to the optical module 1 manufacturing method of the present embodiment.

Further in the present embodiment, a plurality of optical/electrical converters 21 in states secured to the receptacle 30 are electrically connected to the substrate 20 (see FIG. 3C.) Therefore, misalignment of the optical/electrical converters 21 would be substantially the same in substantially the same direction. As a result, the maximum value of the positional error (maximum positional error) between the optical/electrical converters 21 and the guide pin holes 31 of the receptacle 30 will lessen. If the plurality of the optical/electrical converters 21 were separately connected to the substrate 20, the misalignments of the optical/electrical converters 21 on the substrate 20 would differ from each other so that when the receptacle 30 is placed thereafter, the maximum positional error between the optical/electrical converters 21 and the receptacle 30 would increase resulting to a possibility in an increase in the transmission loss of the optical signals. In contrast, the present embodiment has the plurality of the optical/electrical converters 21 in states secured to the receptacle 30, electrically connected to the substrate 20 thereby suppressing the maximum positional error between the entrance and exit points of the optical/electrical converters 21 and the guide pin holes 31 which in turn enables to suppress the transmission loss of the optical signals.

The receptacle 30 is preferably secured to the substrate with adhesives after electrically connecting the optical/electrical converters 21 to the substrate 20. Hereby, damages to the (soldered) connection between the optical/electrical converters 21 and the substrate 20 can be suppressed when a force is applied to the receptacle 30, such as when attaching/detaching the optical connector ferrule 10.

The optical module 1 including the optical/electrical converters 21, receptacle 30 and the substrate 20 is manufactured by the above described process. And as illustrated in FIG. 1A and FIG. 1B, insertion of the guide pins 11 of the optical connector ferrule 10 into the guide pin holes 31 of the receptacle 30 of this optical module 1 allows passive alignment of the optical connector ferrule 10 with the receptacle 30 thereby enabling optical coupling between the optical/electrical converters 21 and the optical fibers 5A of the optical connector ferrule 10.

<First Modified Example of Receptacle 30>

The aforementioned embodiment did not have an optical system such as a lens array arranged between the optical/electrical converters 21 and the optical connector ferrule 10. However, a lens array may be arranged between the optical/electrical converters 21 and the optical connector ferrule 10.

Figure 4:
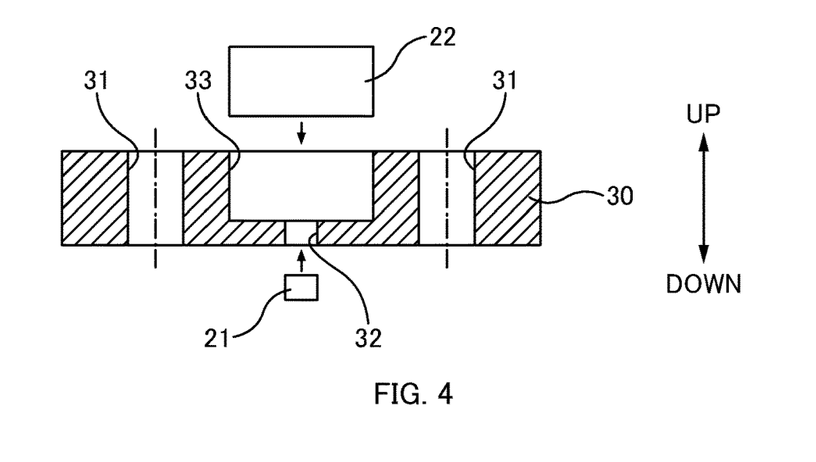
FIG. 4 is a sectional view describing a receptacle 30 according to a first modified example.

FIG. 4 is a sectional view describing a receptacle 30 according to the first modified example.

The receptacle 30 according to the first modified example has an optical component accommodating portion 33 above the device accommodating portion 32. The optical component accommodating portion 33 is a section which accommodates the optical component 22 (e.g., lens array) and is formed to match with the profile of the optical component such that the optical component 22 fits therein. The profile of the optical component 22 is formed with a high degree of accuracy to have a predetermined positional relationship with respect to the optical axis of the optical component 22.

The outer faces of the optical component 22 comes into contact with the inner wall faces of the optical component accommodating portion 33 of the receptacle 30 when the optical component 22 is accommodated in the optical component accommodating portion 33 of the receptacle 30 so that the optical component 22 is passively aligned with respect to the receptacle 30. The optical component 22 is secured to the receptacle 30 with adhesives after the optical component 22 is accommodated in the optical component accommodating portion 33. Here, the process of securing the optical component 22 to the receptacle 30 may be performed before or after the process of bonding the optical/electrical converter 21 to the receptacle 30.

<Second Modified Example of Receptacle 30>

The aforementioned embodiment had the upper side of the device accommodating portion 32 of the receptacle 30 opened. However, the device accommodating portion 32 may be formed in a depressed shape.

Figure 5:
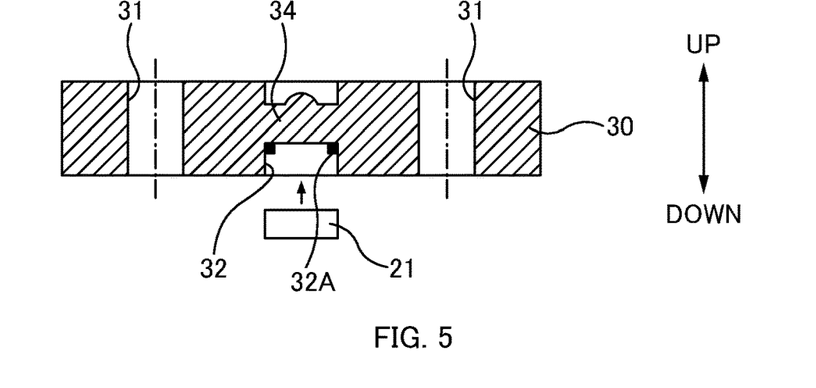
FIG. 5 is a sectional view describing a receptacle 30 according to a second modified example.

FIG. 5 is a sectional view describing a receptacle 30 according to the second modified example.

The receptacle 30 according to the second modified example is made of a material which allows transmission of optical signals and has a device accommodating portion 32 in a depressed shape. A light transmission portion 34 integrally formed with the receptacle 30 is formed above the depressed device accommodating portion 32. Here, the light transmission portion 34 is formed to function as a lens array. The lens array may be integrally formed to the receptacle 30 in this way. Hereby, passive alignment of the optical/electrical converter 21 with the light transmission portion 34 of the receptacle 30 is enabled.

There is a possibility of the entrance and exit points of the optical/electrical converter 21 coming into contact with the upper side of the inner wall face of the device accommodating portion 32 when the device accommodating portion 32 is formed in a depressed shape. Therefore, preferably, an abutting portion 32A is formed to the upper side of the inner wall faces of the device accommodating portion 32 to allow the top face of the optical/electrical converter 21 to come into contact with the abutting portion 32A, as illustrated in FIG. 5. Further, an effect of the entrance and exit points of the optical/electrical converter 21 being aligned in the up-down direction with respect to the receptacle 30 can be achieved by the top face of the optical/electrical converter 21 coming into contact with the abutting portion 32A.

<Third and Fourth Modified Examples of Receptacle 30>

The aforementioned embodiment assumed that the electrode terminals of the optical/electrical converter 21 were to be disposed on the down side (on the substrate 20 side.) However, the electrode terminals of the optical/electrical converter 21 may be disposed on the up side.

Figure 6:
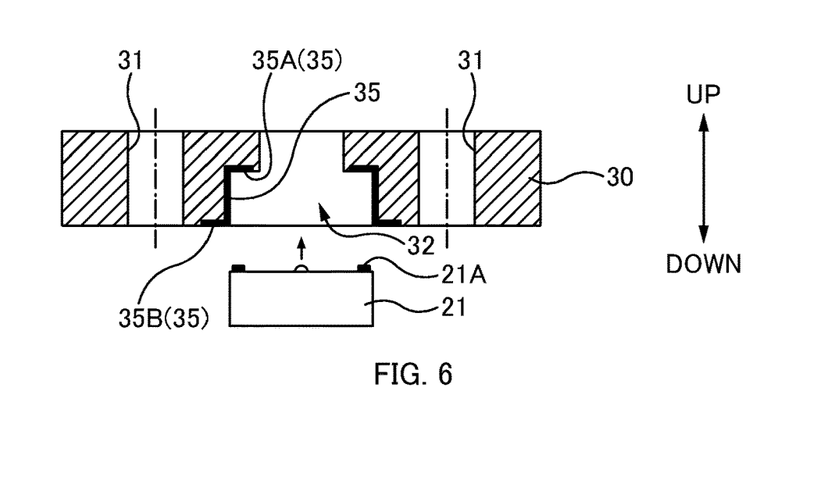
FIG. 6 is a sectional view describing a receptacle 30 according to a third modified example.

FIG. 6 is a sectional view describing a receptacle 30 according to the third modified example.

The receptacle 30 according to the third modified example has a device accommodating portion 32 in a depressed shape. An opened portion is formed at the center part above the device accommodating portion 32. This opened portion is formed to a position of the entrance and exit points of the optical/electrical converter 21. The top face of the optical/electrical converter 21 has disposed electrode terminals 21A. And wiring 35 are laid out to the device accommodating portion 32 of the receptacle 30.

The wiring 35 of the receptacle 30 includes a device side terminal 35A and a substrate side terminal 35B. The device side terminal 35A is a terminal which connects to the electrode terminals 21A and is disposed on the up side of the inner wall face of the device accommodating portion 32 of the receptacle 30. The substrate side terminal 35B is a terminal which connects to the substrate 20 and is disposed on the lower face (face on the substrate 20 side) of the receptacle 30. One end of the wiring 35 of the receptacle 30 has provided the device side terminal 35A and the other end has provided the substrate side terminal 35B.

In the third modified example, the optical/electrical converter 21 and the device side terminal 35A of the receptacle 30 are electrically connected when the optical/electrical converter 21 is secured to the receptacle 30 (see FIG. 3B.) Further in the third modified example, the substrate side terminal 35B of the receptacle 30 being electrically connected with the substrate 20 allows the optical/electrical converter 21 to be electrically connected to the substrate 20 through the wiring 35 formed to the receptacle 30.

Figure 7A:
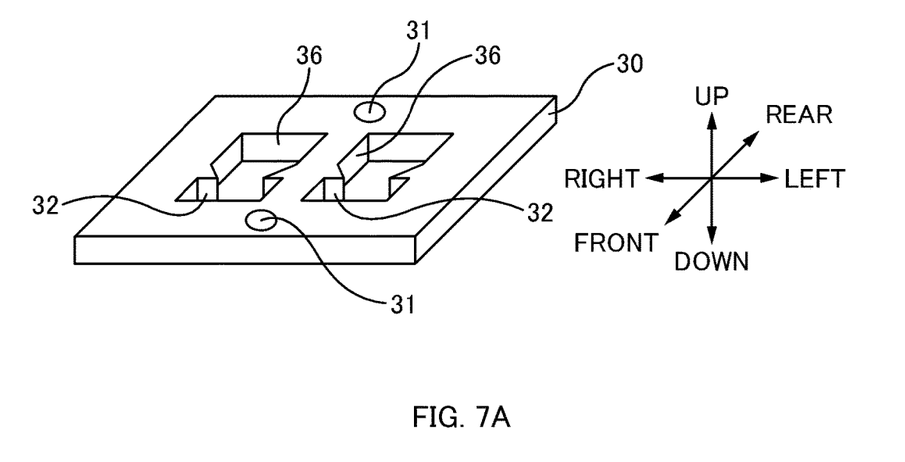
FIG. 7A and FIG. 7B are an explanatory perspective views describing a receptacle 30 according to a fourth modified example.
Figure 7B:
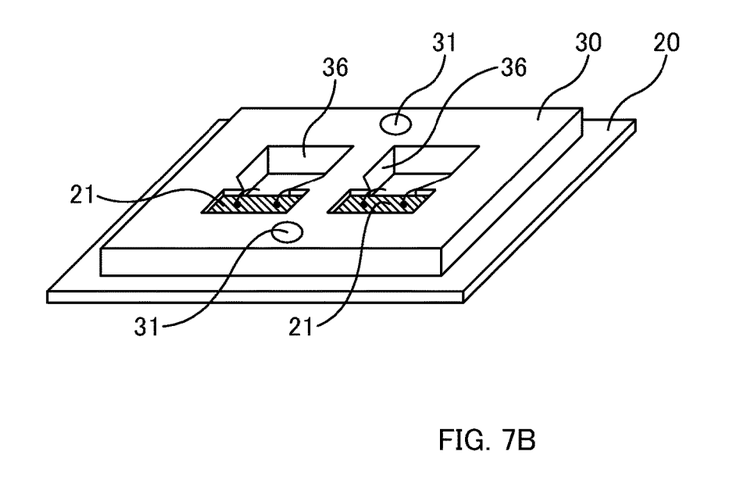

FIG. 7A and FIG. 7B are an explanatory perspective views describing a receptacle 30 according to the fourth modified example.

The receptacle 30 according to the fourth modified example has a wiring accommodating portion 36 formed in a manner connected to the device accommodating portion 32, as illustrated in FIG. 7A. The wiring accommodating portion 36 is a section which accommodates the bonding wire and is a through hole into which a tip of a capillary of a bonding machine can be inserted. The terminal (terminal which is to be electrically connected to the electrode terminal 21A of the optical/electrical converter 21) of the substrate 20 would be disposed inside the wiring accommodating portion 36 when the receptacle 30 is disposed on the substrate 20.

In the fourth modified example, the optical/electrical converter 21 secured to the receptacle 30 is electrically connected to the substrate 20 by wire bonding, as illustrated in FIG. 7B. The bonding wires which connect the electrode terminals 21A of the optical/electrical converter 21 to the substrate 20 terminals is formed to the wiring accommodating portion 36. The uppermost portion of the bonding wire is preferably located below the top face of the receptacle 30 in order to prevent interference of the bonding wire with the bottom face of the optical connector ferrule 10. Here, the bonding wire may be sealed by filling resin into the wiring accommodating portion 36 after the wire bonding connection.

The receptacles 30 according to the above described third and fourth modified examples allow the optical/electrical converter 21 and the substrate 20 to be electrically connected even when the electrode terminals 21A of the optical/electrical converter 21 are arranged on the upper side (on the side opposite the substrate 20.)

Others

The above described embodiments are simply for facilitating the understanding of the present invention and are not in any way to be construed as limiting the present invention. Needless to say, the present invention may variously be changed or altered without departing from its spirit and encompass equivalents thereof.

<Optical Connector Ferrule 10>

The aforementioned optical connector ferrule 10 had a function as an optical path converter by including a reflecting face 16. However, the optical connector ferrule may not include a reflecting face and the optical path inside the optical connector ferrule need not be refracted.

Further, the aforementioned optical connector ferrule 10 is configured with optically transmissive material and allowed optical signals to pass through between the endfaces of the optical fibers 5A and the optical signal face 15. However, the optical connector ferrule may be configured with optically non-transmissive material and have the endfaces of the optical fibers exposed from the endface of the optical connector ferrule.

What is claimed is:

1. A manufacturing method of an optical module comprising a converter from optical signals to electrical signals or from electrical signals to optical signals, a receptacle, and a substrate,
wherein the receptacle comprises a guide portion that aligns an optical connector ferrule that holds an end portion of an optical fiber and a device accommodating portion that matches with a profile of the converter,
wherein the receptacle further comprises a material that allows transmission of optical signals and a light transmission portion integrally formed with the receptacle and disposed between the device accommodating portion and the optical connector ferrule, the light transmission portion forming a lens array, and
wherein the device accommodating portion opens toward the substrate and comprises a plurality of inner wall faces, each inner wall face facing an outer face of the converter such that the outer faces contact the inner wall faces,
the method comprising:
passively aligning the converter with respect to the receptacle by accommodating the converter in the device accommodating portion;
securing the converter to the receptacle, the converter being accommodated in the device accommodating portion; and
mounting the converter directly on the substrate by electrically connecting the converter directly to the substrate that electrically connects to the converter the converter secured to the receptacle.

2. The optical module manufacturing method according to claim 1, further comprising securing the receptacle to the substrate after electrically connecting the converter to the substrate.

3. The optical module manufacturing method according to claim 1, wherein
the receptacle further comprises an optical component accommodating portion that accommodates an optical component deposited between the converter and the optical connector ferrule, and
the optical module manufacturing method further comprises accommodating the optical component in the optical component accommodating portion and securing the optical component to the receptacle.

4. The optical module manufacturing method according to claim 1, wherein the device accommodating portion is formed in a depressed shape.

5. The optical module manufacturing method according to claim 1, wherein
the receptacle further comprises a wiring comprising a device side terminal deposited to the device accommodating portion and a substrate side terminal deposited on a face on a side of the substrate, and
the converter secured to the receptacle is electrically connected to the substrate by electrically connecting the converter to the device side terminal and electrically connecting the substrate to the substrate side terminal.

6. The optical module manufacturing method according to claim 1, wherein the receptacle further comprises a wire accommodating portion connected to the device accommodating portion, and a bonding wire formed to the wire accommodating portion electrically connects a terminal of the converter and a terminal of the substrate arranged inside the wire accommodating portion.

7. The optical module manufacturing method according to claim 1, wherein:
the converter has an entrance or exit point of an optical signal and outer faces,
the device accommodating portion has inner wall faces formed to have a predetermined positional relationship with respect to the guide pin holes, and
the inner wall faces of the device accommodating portion function as guide faces to guide the outer faces of the converter for aligning the entrance or exit point of the optical signal of the converter.

8. The optical module manufacturing method according to claim 1, wherein mounting the converter directly on the substrate is performed after securing the converter to the receptacle.

9. The optical module manufacturing method according to claim 1, wherein the optical module further comprises a plurality of converters, and
the method further comprises securing the plurality of converters to the receptacle.

10. The optical module manufacturing method according to claim 9, wherein the receptacle further comprises a plurality of device accommodating portions, each device accommodating portion of the plurality of device accommodating portions corresponding to one converter of the plurality of converters,
wherein each device accommodating portion accommodates the respective converter.

11. A manufacturing method of an optical module comprising a converter from optical signals to electrical signals or from electrical signals to optical signals, a receptacle, a substrate, and an optical connector ferrule comprising a first guide portion,
wherein the receptacle comprises a second guide portion that positions the optical connector ferrule that holds an end portion of an optical fiber and a device accommodating portion that matches with a profile of the converter,
wherein the receptacle further comprises a material that allows transmission of optical signals and a light transmission portion integrally formed with the receptacle and disposed between the device accommodating portion and the optical connector ferrule, the light transmission portion forming a lens array, and
wherein the device accommodating portion opens toward the substrate and comprises a plurality of inner wall faces, each inner wall face facing an outer face of the converter such that the outer faces contact the inner wall faces,
the method comprising:
passively aligning the converter with respect to the receptacle by accommodating the converter in the device accommodating portion;
securing the converter to the receptacle, the converter being accommodated in the device accommodating portion;
mounting the converter directly on the substrate by electrically connecting the converter directly to the substrate that electrically connects to the converter the converter secured to the receptacle; and
aligning the receptacle with the optical connector ferrule, using the first guide portion and the second guide portion, and optically connecting the converter and the optical fiber.

12. A manufacturing method of an optical module comprising a converter from optical signals to electrical signals or from electrical signals to optical signals, a receptacle, and a substrate,
wherein the receptacle comprises a guide portion that aligns an optical connector ferrule that holds an end portion of an optical fiber, a device accommodating portion that matches with a profile of the converter, and an integrally formed light transmission portion,
wherein the receptacle further comprises a material that allows transmission of optical signals and a light transmission portion integrally formed with the receptacle and disposed between the device accommodating portion and the optical connector ferrule, the light transmission portion forming a lens array, and
wherein the device accommodating portion opens toward the substrate and comprises a plurality of inner wall faces, each inner wall face facing an outer face of the converter such that the outer faces contact the inner wall faces,
the method comprising:
passively aligning the converter with respect to the receptacle by accommodating the converter in the device accommodating portion;
securing the converter to the receptacle, the converter being accommodated in the device accommodating portion; and
electrically connecting to the substrate that electrically connects to the converter the converter secured to the receptacle.

* * * * *